United States Patent
Whalen et al.

(10) Patent No.: US 7,794,023 B2
(45) Date of Patent: Sep. 14, 2010

(54) SEAT BELT RETRACTOR MOUNTING SYSTEM

(75) Inventors: Kelly Michael Whalen, Worthington, OH (US); Hidetsugu Okazaki, Dublin, OH (US); Brent Moffitt, Dublin, OH (US); Hiroyuki Honda, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 12/349,064

(22) Filed: Jan. 6, 2009

(65) Prior Publication Data

US 2009/0115237 A1    May 7, 2009

Related U.S. Application Data

(63) Continuation of application No. 11/468,738, filed on Aug. 30, 2006, now Pat. No. 7,497,521.

(51) Int. Cl.
*B60R 22/00* (2006.01)

(52) U.S. Cl. .................. 297/474; 297/475; 297/452.18

(58) Field of Classification Search ............... 297/474, 297/475, 452.18
See application file for complete search history.

(56) References Cited

U.S. PATENT DOCUMENTS

| 4,213,651 A * | 7/1980 | Yoshitsugu et al. | 297/475 |
| 4,529,249 A * | 7/1985 | Ino | 297/474 X |
| 4,568,106 A * | 2/1986 | Yokoyama | 297/475 X |
| 7,063,389 B2 * | 6/2006 | Kennedy, Sr. | 297/475 |

* cited by examiner

*Primary Examiner*—Anthony D Barfield
(74) *Attorney, Agent, or Firm*—Mark Duell; Michael A. Forhan; Eley Law Firm Co.

(57) ABSTRACT

A seat belt retractor mounting system for a vehicle seat includes a bracket having a first sidewall and a second sidewall. A generally planar plate is located generally parallel to and spaced apart from the first sidewall of the bracket. The plate is coupled to the second sidewall. In addition, at least one of the bracket and plate are secured to, and cooperate with, a seat cushion frame of the seat to surround and protect an emergency locking retractor mounted to the first sidewall. A method employs the system.

15 Claims, 8 Drawing Sheets

SEAT BELT RETRACTOR MOUNTING SYSTEM

This application is a continuation of U.S. patent application Ser. No. 11/468,738, filed Aug. 30, 2006, the entire contents of which are hereby incorporated herein by reference thereto.

FIELD

The present invention relates generally to vehicle occupant restraints, in particular to a mounting system for a seat-mounted emergency locking retractor.

BACKGROUND

Vehicle occupant restraints, including seat belt devices, are important and well-known components of vehicle safety systems. If a vehicle experiences a severe impact a properly belted-in occupant is generally held in place by the seat belt's webbing, thereby avoiding many serious, if not fatal, physical collisions with the vehicle interior and/or being ejected from the vehicle. Since their introduction seat belts have saved countless lives and reduced the severity of injury in countless more.

Current seat-mounted occupant restraint systems often locate the seat belt emergency locking retractor on the frame of the seat cushion and route the seat belt webbing upwardly along a rear portion of the seat back. However, locating the retractor in this manner may expose it to contact with rear seat passengers or objects stored behind the seat, increasing the potential for damage to the retractor either during normal use or in the event of a collision. Furthermore, the orientation of the retractor is often critical to its proper operation. Accordingly, it must be securely anchored such that its orientation is maintained both during normal use and in the event of a collision. There is a need for a way to protect the seat belt retractor from damage due to contact with passengers or objects behind the seat. There is a further need to maintain the orientation of the retractor to better ensure its proper operation.

SUMMARY

An embodiment of the present invention is a seat belt emergency locking retractor mounting system. The system comprises a bracket and a plate that cooperate with seat cushion frame components of a vehicle seat to form an enclosed mounting environment for the retractor. The bracket and plate form three sidewalls of the enclosure, with a side member of the cushion frame forming a fourth sidewall. The retractor is mounted within the enclosure and is attached to the bracket. The components of an aspect of the disclosed invention are located generally below the reclining apparatus of the seat's seatback in order to allow for adjustment of the seatback. An embodiment of the present invention ensures that the orientation of the retractor is maintained under various operating conditions and that the retractor is securely anchored in all directions. An embodiment of the present invention additionally protects the retractor from contact with passengers and objects located behind the seat.

One aspect of the present invention is a seat belt retractor mounting system for a vehicle seat. The system includes a bracket having a first sidewall and a second sidewall. A generally planar plate is located generally parallel to and spaced apart from the first sidewall of the bracket. The plate is coupled to the second sidewall. In addition, at least one of the bracket and plate are secured to, and cooperate with, a seat cushion frame of the seat to surround and protect an emergency locking retractor mounted to the first sidewall.

Another aspect of the present invention is a method for mounting a seat belt retractor to a vehicle seat. The method comprises the steps of providing a bracket having a first sidewall and a second sidewall, and coupling a generally planar plate to the bracket such that the plate is generally parallel to and spaced apart from the first sidewall of the bracket. Additional steps include securing at least one of the bracket and plate to a seat cushion frame of the seat, and mounting an emergency locking retractor mounted to the first sidewall such that the retractor is generally surrounded by the bracket, plate and frame.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
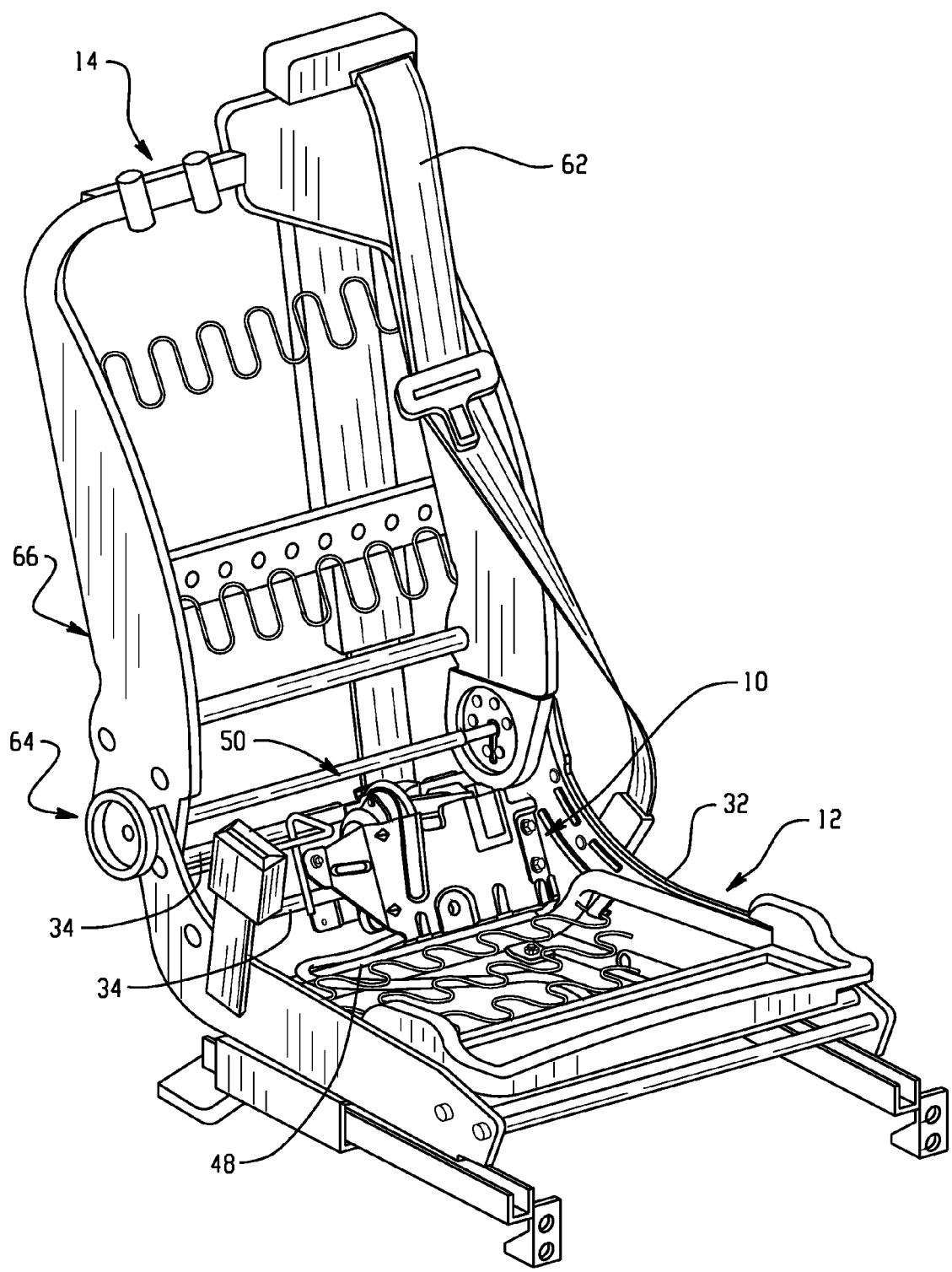
FIG. 1 shows the general arrangement of a seat belt retractor mounting system installed into a left-hand vehicle seat frame according to an embodiment of the present invention.
Figure 2:
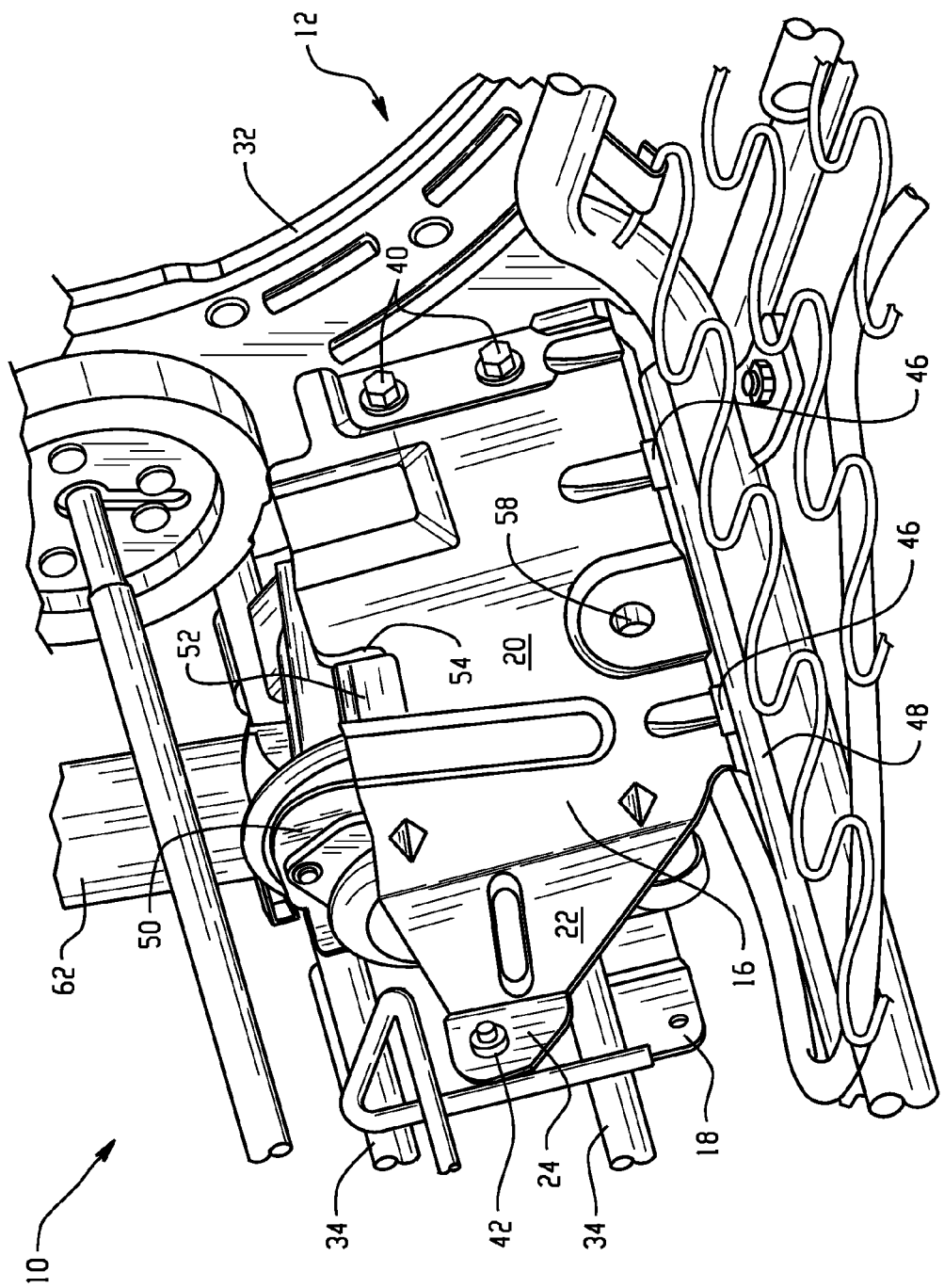
FIG. 2 provides details of the components of the seat belt retractor mounting system of FIG. 1.

The general arrangement of a seat belt retractor mounting system 10 is shown in FIGS. 1 and 2 according to an embodiment of the present invention. Retractor mounting system 10 generally comprises a bracket 16 and a plate 18. Retractor mounting system 10 is attached to a side member of a seat cushion frame 12 of a vehicle seat 14, as discussed in greater detail below.

Figure 3:
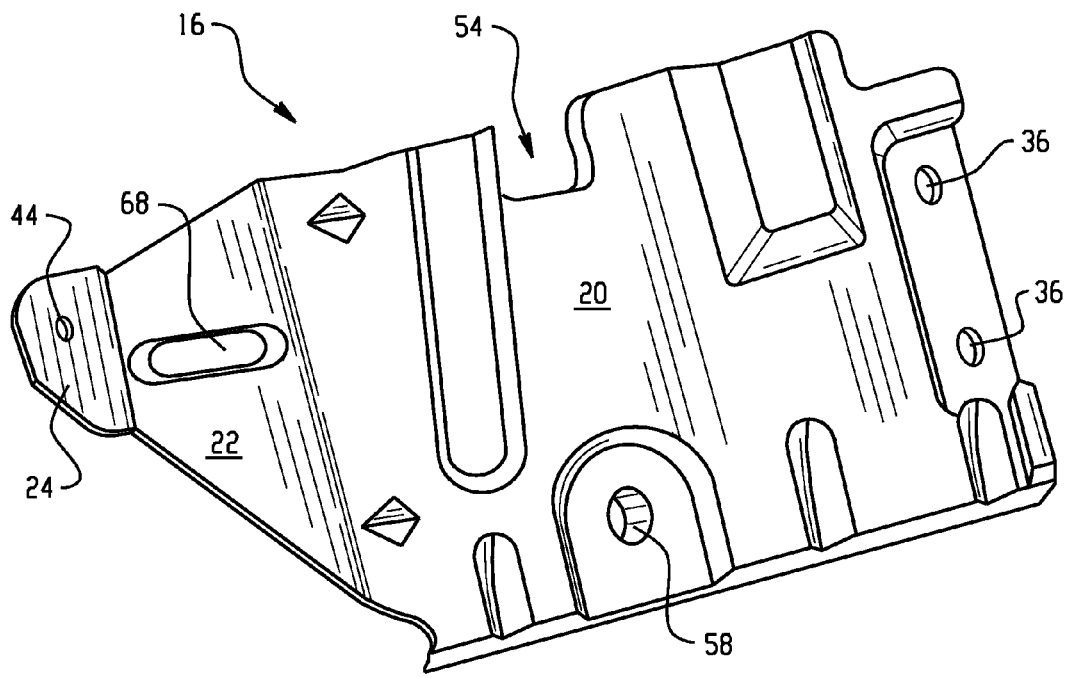
FIG. 3 depicts a bracket component of the seat belt retractor mounting system of FIG. 1.

With reference to FIGS. 2 and 3, bracket 16 includes a first sidewall 20 and a second sidewall 22. Second sidewall 22 may further include a mounting flange 24. Bracket 16 may be formed as a unitary piece from any suitable material compatible with other components of seat belt retractor mounting system 10 and the expected environment including, without limitation, metals such as steel, plastic, and composites, and may be fabricated using any conventional processes such as, without limitation, molding, stamping, casting and machining. Bracket 16 may also be finished by such processes as painting, plating and coating, or left unfinished.

Figure 4A:
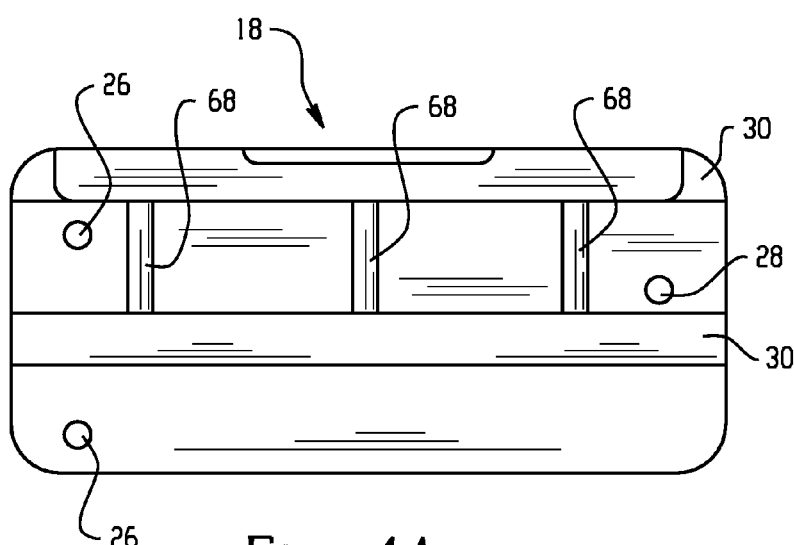
FIG. 4A is a rear elevational view of a plate component of the seat belt retractor mounting system of FIG. 1.
Figure 4B:
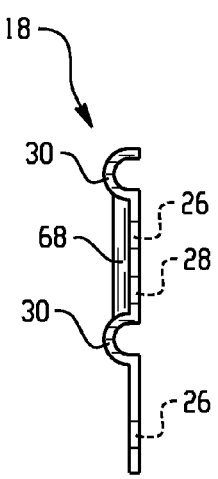
FIG. 4B is a side elevational view of the plate of FIG. 4A.
Figure 5:
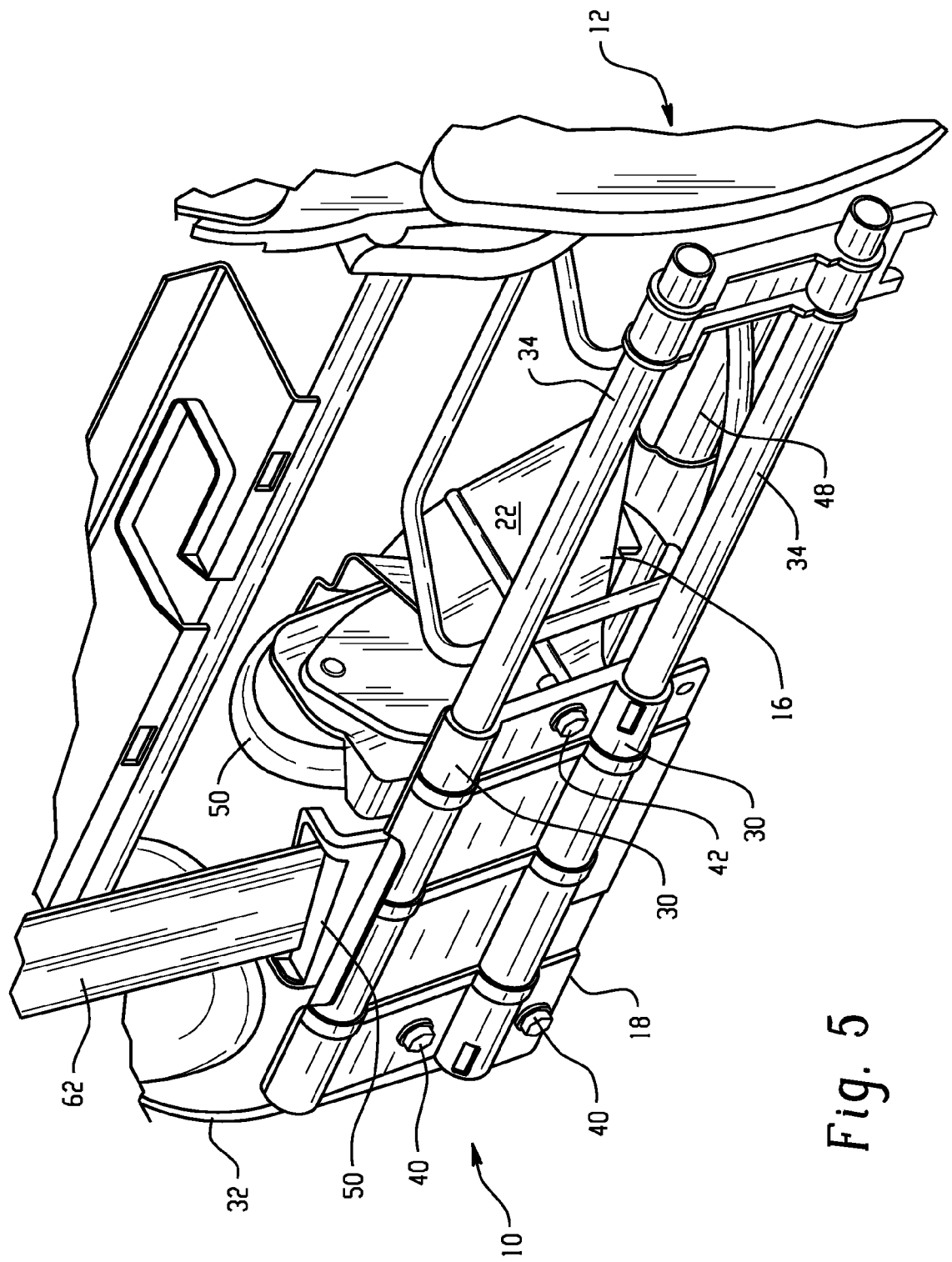
FIG. 5 is a rear view of the seat belt retractor mounting system of FIG. 1.
Figure 6:
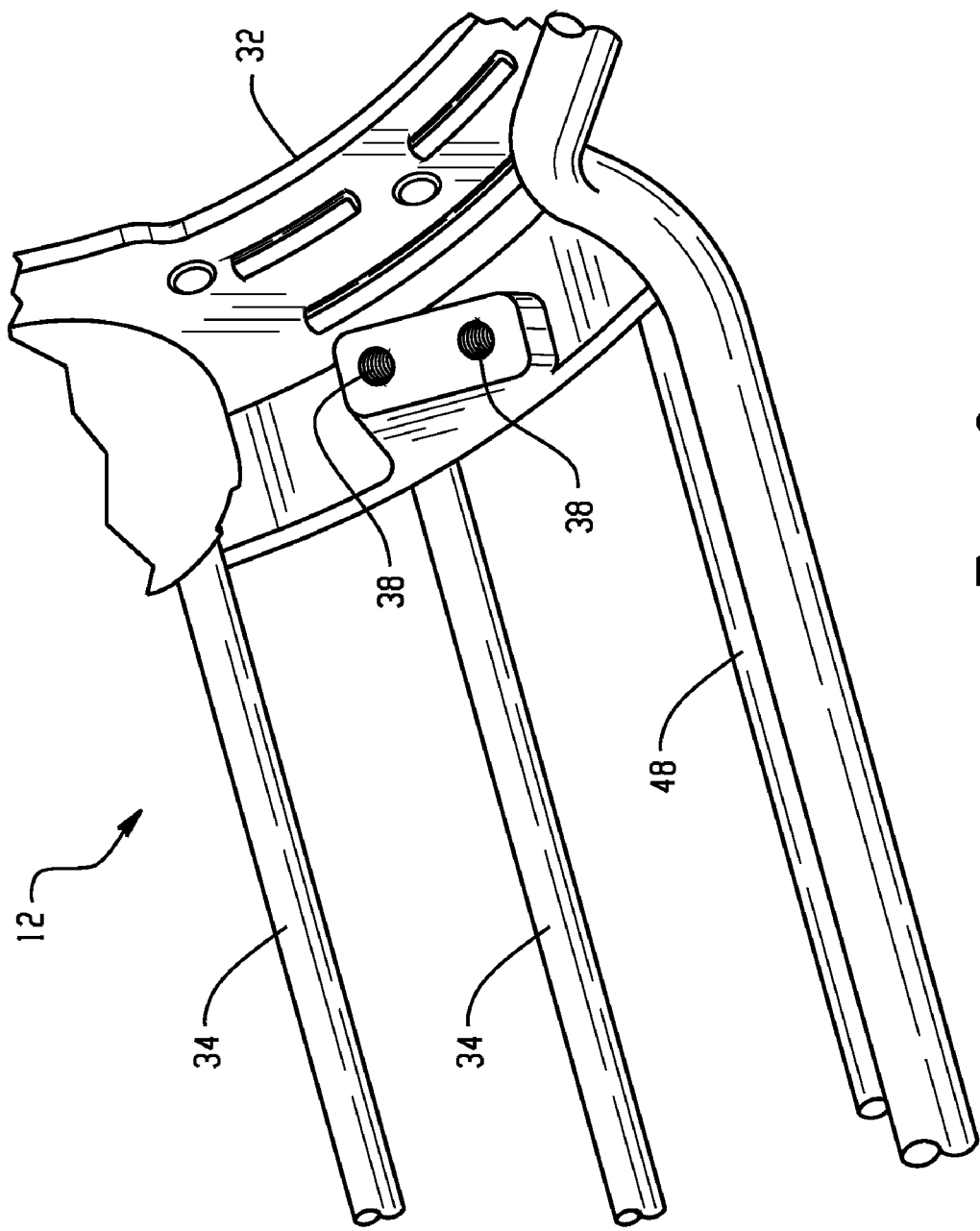
FIG. 6 shows details of a portion of a seat cushion frame according to an embodiment of the present invention.

With reference to FIGS. 4A, 4B and 5, plate 18 is generally rectangularly-shaped and planar. Plate 18 may include one or more mounting holes 26, 28 for attaching the plate to mounting system 10 in a manner detailed further below. Plate 18 may further include one or more channels 30 along its longitudinal axis.

Plate 18 may be formed as a unitary piece from any suitable material compatible with other components of seat belt retractor mounting system 10 and the expected environment including, without limitation, metals such as steel, plastic, and composites, and may be fabricated using any conventional processes such as, without limitation, molding, stamping, casting and machining. Plate 18 may also be finished by such processes as painting, plating and coating, or left unfinished.

With reference now to FIGS. 1 through 9 in combination, seat belt retractor mounting system is assembled by locating bracket 16 and plate 18 at a side member 32 of seat cushion frame 12 such that the side member is positioned between the bracket and plate (FIGS. 2 and 5). Plate 18 is oriented such that channels 30 engage corresponding support braces 34 of frame 12 (FIGS. 4B and 5). Mounting openings 26, 36 and 38 (FIGS. 3, 4A, 6) in plate 18, bracket 16 and frame side member 32 respectively are aligned, then fastened together with one or more fasteners 40 such as rivets, bolts, nuts and screws, at least a portion of the fastener extending through the aligned openings (FIGS. 2 and 5). Bracket 16 may also be attached directly to plate 18 with one or more fasteners 42 such as rivets, bolts, nuts and screws, at least a portion of the fastener extending through opening 28 in the plate and a corresponding opening 44 in mounting flange 24 of the bracket (FIGS. 2 and 5). Bracket 16 may be further secured to frame 12 by one or more weldments 46 between the bracket and a cross member 48 of the frame (FIG. 2).

Figure 7:
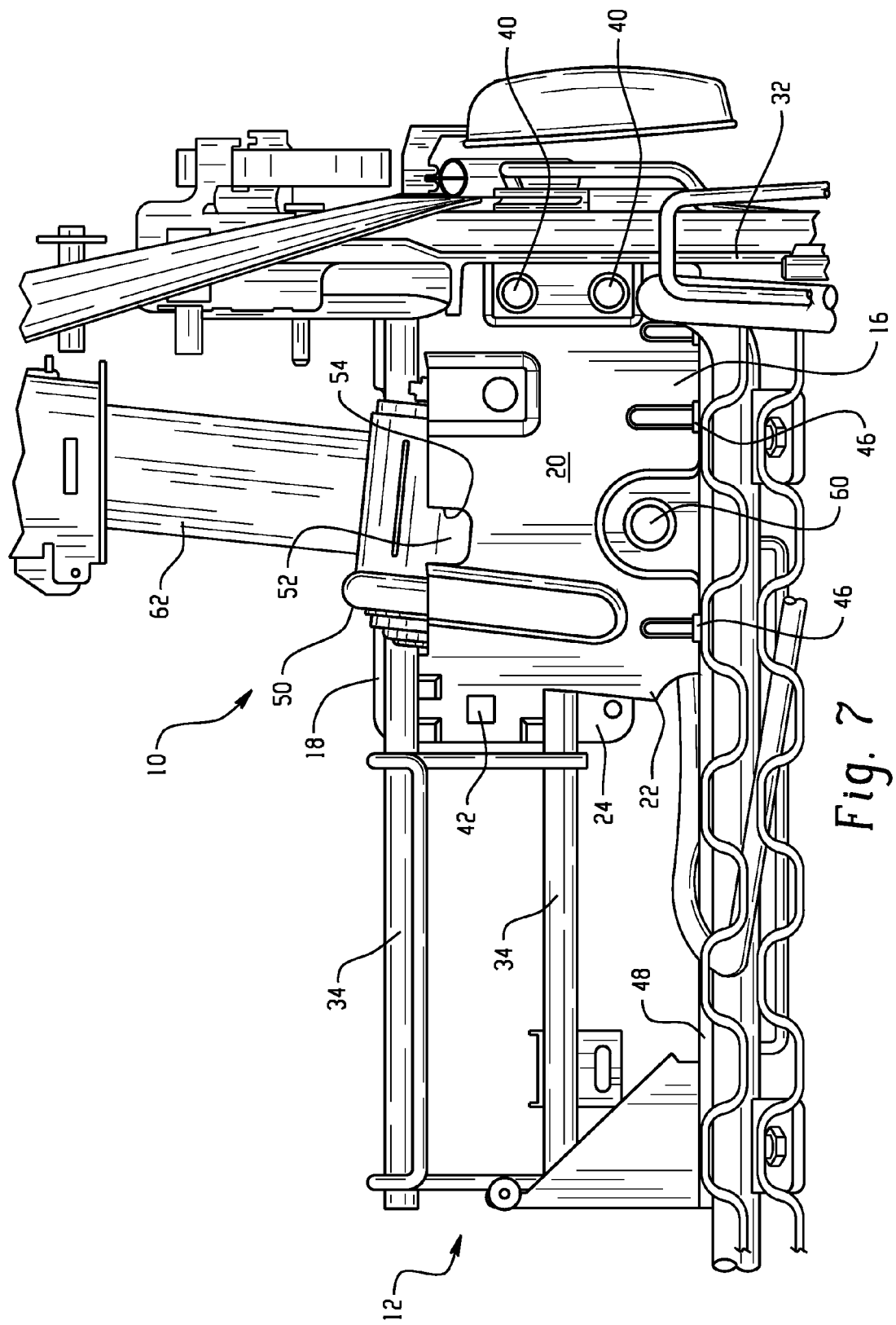
FIG. 7 is a front view of the seat belt retractor mounting system of FIG. 1.
Figure 8:
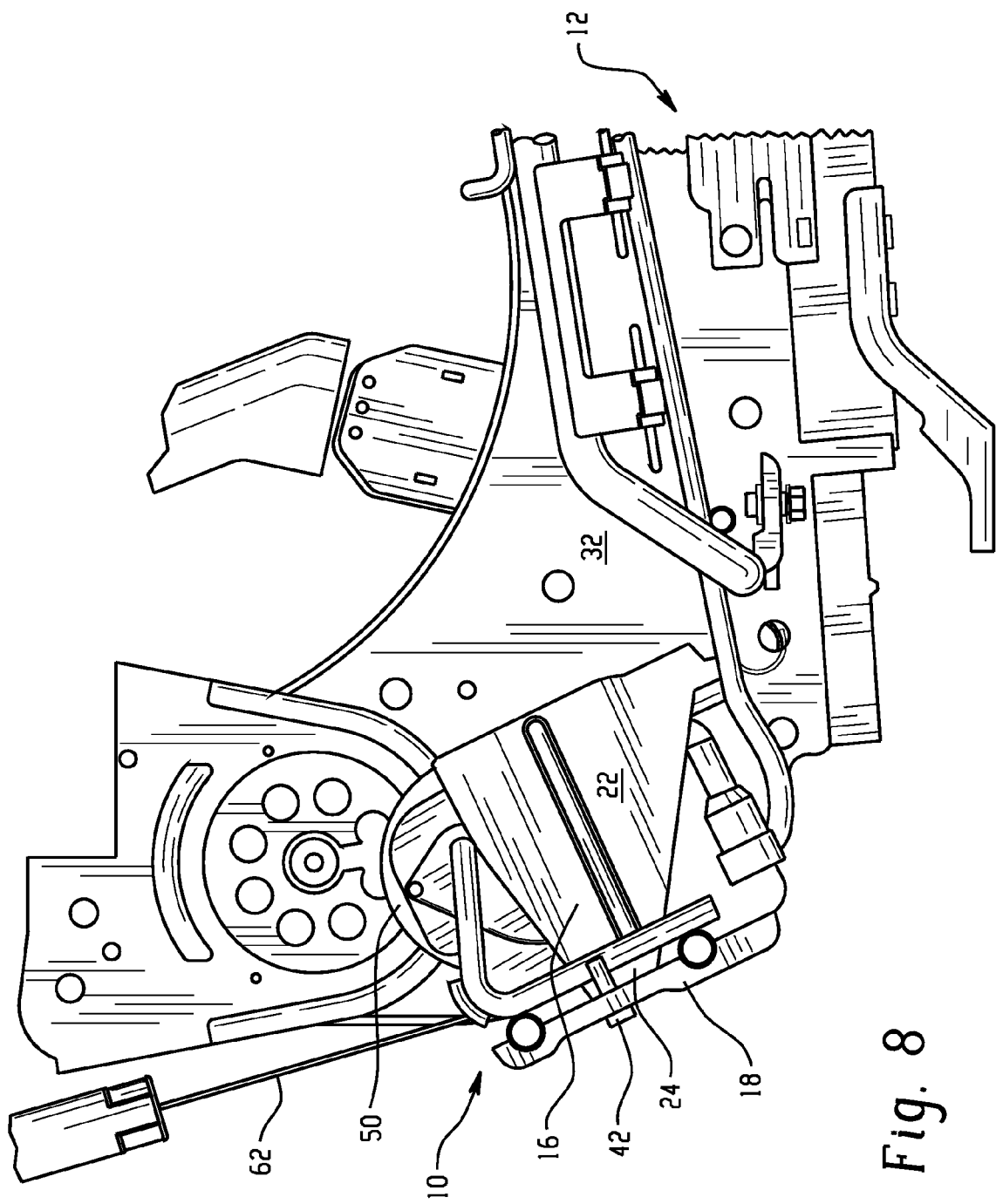
FIG. 8 is a side view of the seat belt retractor mounting system of FIG. 1.
Figure 9:
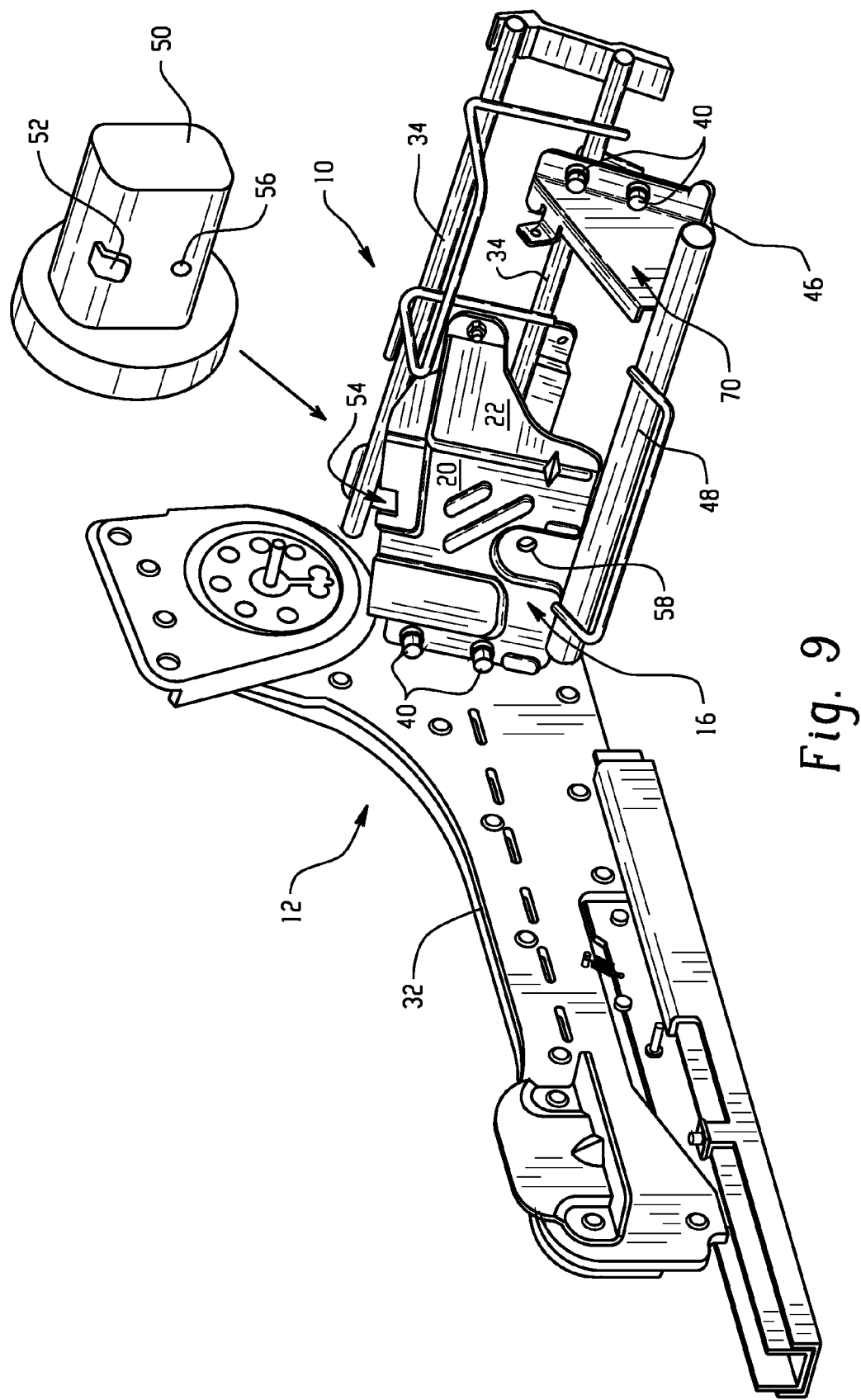
FIG. 9 shows an emergency locking retractor being mounted to a bracket of a retractor mounting system installed into a right-hand vehicle seat frame according to an embodiment of the present invention.

With reference to FIGS. 7 and 9, a seat belt emergency locking retractor 50 is installed into seat 14 by locating the retractor within the sidewalls formed by bracket 16, plate 18 and frame side member 32 such that a tab 52 of the retractor engages a notch 54 of the bracket. A mounting opening 56 of retractor 50 is aligned with a corresponding opening 58 of bracket 16 and is attached with one or more fasteners 60 such as rivets, bolts, nuts and screws, at least a portion of the fastener extending through the aligned openings. Tab 52, notch 54, openings 56, 58 and fastener 60 cooperate to secure emergency locking retractor 50 at a predetermined orientation to ensure its proper operation, i.e., allowing a seat belt web 62 housed by the retractor to move slidably in and out of the retractor during normal conditions without binding, yet resist movement of the web in the event of a sudden deceleration of the vehicle. Once retractor 50 is oriented and secured seat belt web 62 may be routed through seat 14 as shown generally in FIG. 1 for use by an occupant of the seat.

In operation, retractor 44 is maintained in a predetermined orientation for proper operation of the emergency locking mechanism of the retractor in the event of a sudden deceleration, while allowing web 62 to move slidably in and out of the retractor during normal operation. The rigid, boxlike construction of the sidewalls formed by bracket 16, plate 18 and frame side member 32 protect retractor 50 from contact with passengers and objects located behind the seat. Retractor mounting system 10 is rigidly secured to cross member 48, support braces 34 and frame side member 32, is accordingly securely anchored in all directions, and resists undesirable changes in the position or orientation of retractor 50 in the event of a vehicle collision. Furthermore, as can be seen in FIG. 1, the components of retractor mounting system 10 are located generally below a seat reclining apparatus 64 in order to allow normal seat adjustability and operation, such as changing the angular position of a seatback 66 of seat 14 without adversely affecting the orientation of retractor 50. Retractor mounting system 10 also acts as a barrier between retractor 50 and other components of seat 14, thereby preventing heat generated by the retractor from directly contacting the other components.

It should be noted that the sizes and shapes of the components of retractor mounting system 10 are not critical and may be varied to accommodate the needs of a particular seat frame 12 and emergency locking retractor 50. For example, cutouts and openings may be installed in the bracket and/or plate to accommodate the various components of seat 14. Likewise, stiffening elements such as ribs 68 (FIGS. 3 and 4A) may be incorporated into bracket 16 and/or plate 18 for added structural strength.

In some embodiments of the present invention seat cushion frame 12 may optionally include a reinforcing brace 70 coupled to the frame, as shown in FIG. 9. Brace 70 is coupled between cross member 48 and one or more frame support braces 34, and acts to resist deformation or movement of the cross member and the support brace, thereby further aiding to resist undesirable changes in the position or orientation of retractor 50 in the event of a vehicle collision. Brace 70 may be coupled to cross member 48 and support brace 34 in any conventional manner using fasteners and/or weldments similar to fasteners 40 and weldments 46, previously detailed above.

Brace 70 may be formed as a unitary piece from any suitable material compatible with other components of seat belt retractor mounting system 10 and the expected environment including, without limitation, metals such as steel, plastic, and composites, and may be fabricated using any conventional processes such as, without limitation, molding, stamping, casting and machining. Brace 70 may also be finished by such processes as painting, plating and coating, or left unfinished.

It should be noted that the figures variously depict embodiments of the present invention installed into seat frames 12 configured for installation into left and right sides of the vehicle interior. The disclosed embodiments of the present invention are generally located at the outboard edge of the seat frame. However, it is understood that the present invention may be likewise located at other positions along seat frame 12, such as at an inboard edge, if dictated by the configuration of a particular safety restraint system.

While this invention has been shown and described with respect to a detailed embodiment thereof, it will be understood by those skilled in the art that changes in form and detail thereof may be made without departing from the scope of the claims of the invention. For example, the various features of the components of retractor mounting system 10, seat 14 and retractor 44 may be keyed, indexed or rendered in separate mirror-image components for use in one of left- and right-hand seats in a vehicle. Alternatively, such left- and right-hand features may be incorporated into reconfigurable components having features compatible with installation of mounting system 10 into both left- and right-hand seats.

What is claimed is:

1. A seat belt retractor mounting system for a vehicle seat, comprising:
   a bracket having a stationary first sidewall and a second, stationary sidewall rigidly coupled thereto;
   a first opening in the bracket;
   an indexing notch in the first sidewall of the bracket;
   a generally planar plate, the plate being generally parallel to and spaced apart from the first sidewall of the bracket and coupled to the second sidewall, the plate forming a third sidewall;
   a seat cushion frame having a frame side member;

an emergency locking retractor mounted to the first sidewall, the emergency locking retractor including a tab and a second opening, the second opening being aligned with the first opening of the bracket; and a first fastener installed into the aligned first and second openings, at least one of the bracket and plate being secured to the frame side member of the seat cushion frame, the frame side member forming a fourth sidewall generally parallel to and spaced apart from the second sidewall, the first, second, third and fourth sidewalls surrounding and protecting the emergency locking retractor, the indexing notch receiving the tab of the emergency locking retractor to establish the orientation and position of the emergency locking retractor, and the indexing notch and tab cooperating with the first fastener to orient and secure the retractor at a predetermined position for a predetermined location in a vehicle into which the seat is mounted.

2. The seat belt retractor mounting system of claim 1 wherein the first sidewall of the bracket is coupled to the seat cushion frame with a second fastener.

3. The seat belt retractor mounting system of claim 1 wherein the second sidewall of the bracket is coupled to the plate with a third fastener.

4. The seat belt retractor mounting system of claim 1 wherein the first sidewall of the bracket is welded to a cross member of the seat cushion frame.

5. The seat belt retractor mounting system of claim 1, further comprising a reinforcing brace coupled to the seat cushion frame.

6. The seat belt retractor mounting system of claim 1 wherein the plate further comprises a channel configured to engage a support brace of the seat cushion frame.

7. The seat belt retractor mounting system of claim 1 wherein the bracket is made from at least one of metal, plastic, and composite materials.

8. The seat belt retractor mounting system of claim 1 wherein the plate is made from at least one of metal, plastic, and composite materials.

9. A seat belt retractor mounting system for a vehicle seat, comprising:

a bracket having a stationary first sidewall and a second, stationary sidewall rigidly coupled thereto, the first sidewall further including an indexing notch to receive a corresponding tab of an emergency locking retractor; and a generally planar plate having a channel, the plate being positioned generally parallel to and spaced apart from the first sidewall of the bracket and coupled to the second sidewall, the plate forming a third sidewall, wherein the channel engages a support brace of a seat cushion frame of the seat and at least one of the bracket and plate are secured to a frame side member of the seat cushion frame, the frame side member forming a fourth sidewall generally parallel to and spaced apart from the second sidewall, wherein the indexing notch and tab cooperate with a first fastener installed into corresponding openings in the bracket and the emergency locking retractor to orient and secure the retractor to a predetermined position for a predetermined location in a vehicle into which the seat is mounted, and wherein the first, second, third and fourth sidewalls surround and protect the emergency locking retractor.

10. The seat belt retractor mounting system of claim 9 wherein the first sidewall of the bracket is coupled to the seat cushion frame with a second fastener and the second sidewall of the bracket is coupled to the plate with a third fastener.

11. The seat belt retractor mounting system of claim 9 wherein the first sidewall of the bracket is welded to a cross member of the seat cushion frame.

12. The seat belt retractor mounting system of claim 9, further comprising a reinforcing brace coupled to the seat cushion frame.

13. A method for mounting a seat belt retractor to a vehicle seat, comprising the steps of:

providing a bracket having a stationary first sidewall and a second, stationary sidewall rigidly coupled thereto;

forming a first opening in the bracket;

forming an indexing notch in the first sidewall of the bracket;

coupling a generally planar plate to the bracket such that the plate is generally parallel to and spaced apart from the first sidewall of the bracket, the plate forming a third sidewall;

providing a seat cushion frame having a frame side member;

providing an emergency locking retractor having a tab and a second opening, the second opening being aligned with the first opening of the bracket;

securing at least one of the bracket and the plate to the frame side member, the frame side member forming a fourth sidewall generally parallel to and spaced apart from the second sidewall;

mounting the emergency locking retractor to the first sidewall such that the retractor is generally surrounded and protected by the first, second, third and fourth sidewalls and such that the indexing notch of the bracket receives the tab of the emergency locking retractor and establishes the orientation and position of the emergency locking retractor mounted thereto; and installing a first fastener into the aligned first and second openings to orient and secure the retractor at a predetermined position for a predetermined location in a vehicle into which the seat is mounted.

14. The method of claim 13, further comprising the steps of:

coupling the first sidewall of the bracket to the seat cushion frame with a second fastener; and coupling the second sidewall of the bracket to the plate with a third fastener.

15. The method of claim 13, further comprising the step of welding the first sidewall of the bracket to a cross member of the seat cushion frame.

* * * * *